July 14, 1959
S. H. CARGILL ET AL
2,894,362
WRAPPING MACHINE
Filed Feb. 20, 1953
2 Sheets-Sheet 2
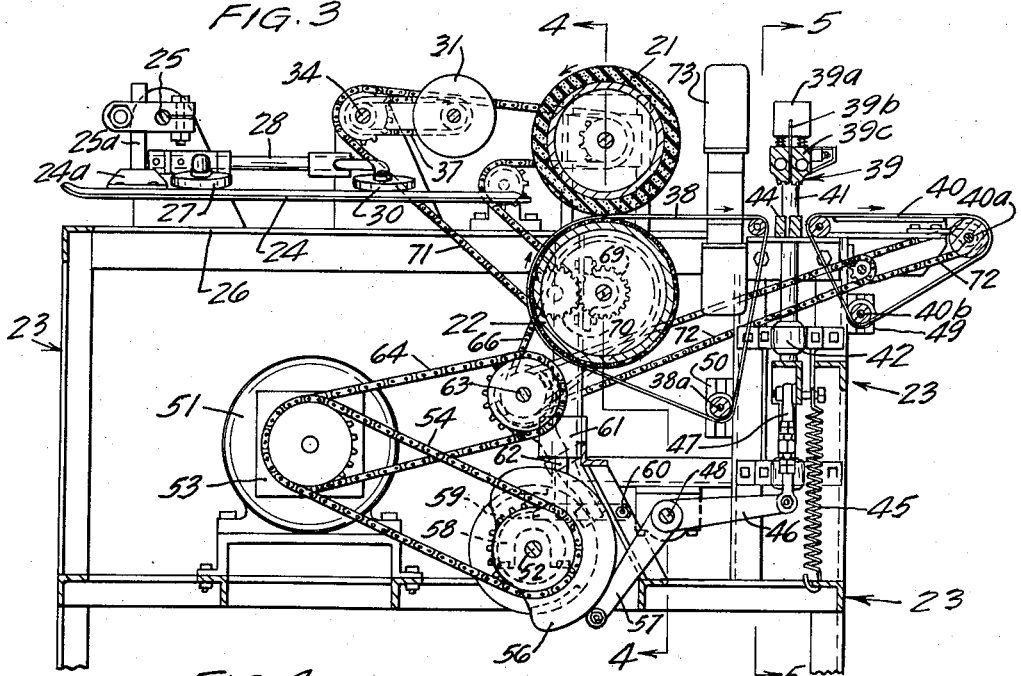
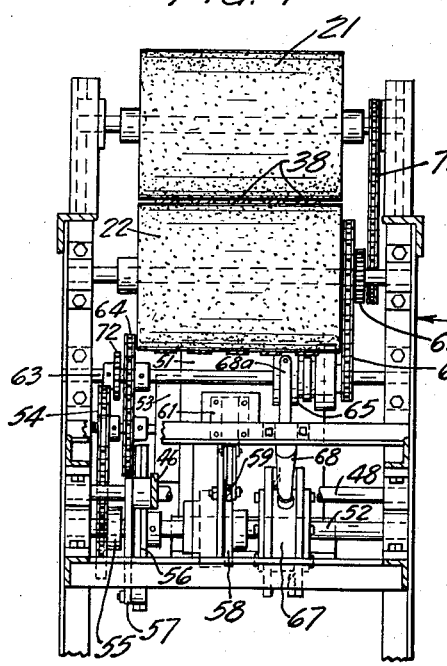
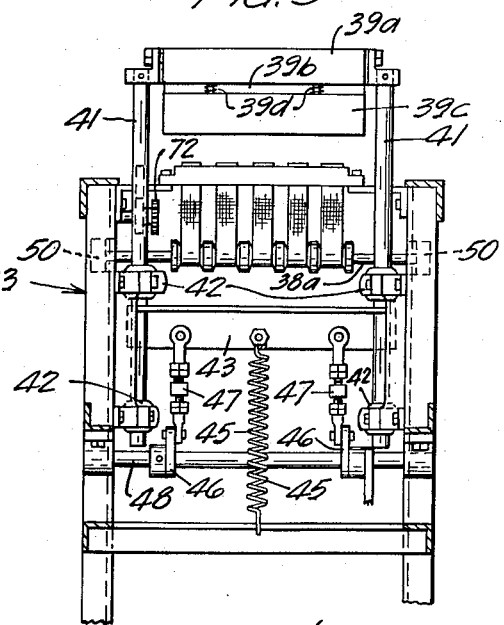
INVENTORS
SYLVESTER H. CARGILL
WILLIAM L. HARKESS
BY Williamson, Williamson, Schroeder & Adams
ATTORNEYS United States Patent Office 2,894,362
Patented July 14, 1959

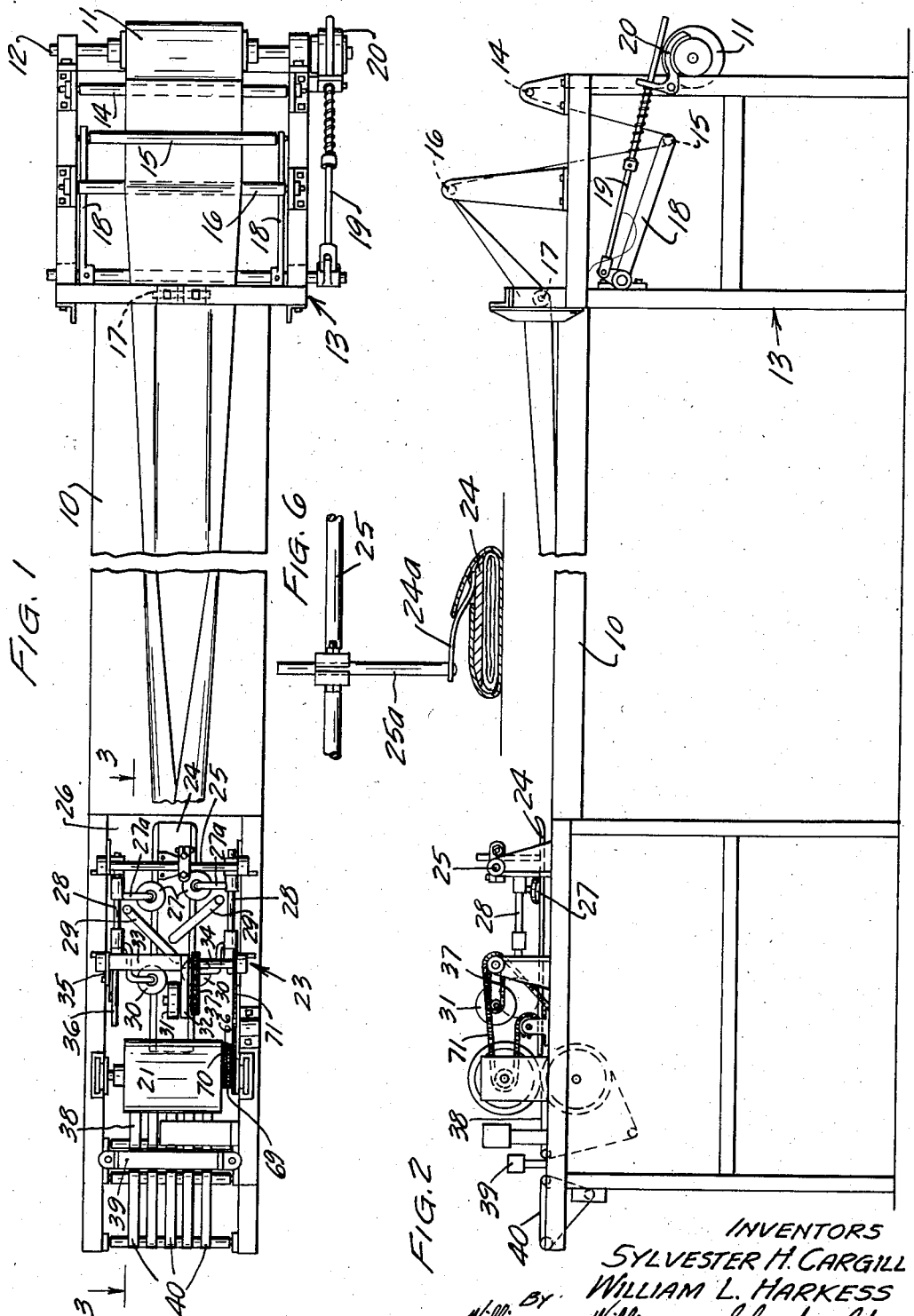

2,894,362
WRAPPING MACHINE
Sylvester H. Cargill, Excelsior, and William L. Harkess, Minneapolis, Minn.; said Harkess assignor to said Cargill Application February 20, 1953, Serial No. 338,024

3 Claims. (Cl. 53—182)

This invention relates to a wrapping machine for articles and particularly to a machine for completely enclosing articles within a wrapper of sheet material responsive to heat and pressure for sealing the same.

It is an object of this invention to provide a novel and highly efficient machine for producing individual sealed packages for articles from a single elongated strip of sheet material responsive to heat and pressure for sealing.

It is another object of this invention to provide a machine for drawing sheet material from a supply roll to permit articles to be laid thereon in longitudinally spaced relation and thereafter said material overlapped to form a longitudinally disposed seam which is sealed by the application of heat and pressure thereto with the articles enclosed therein, said machine finally transversely sealing and severing said tubular material between the spaced articles therein to form a plurality of individual packages with the articles individually sealed therebetween.

More specifically, it is an object to provide a wrapping machine having a pair of wrapper-engaging feeding rollers for drawing sheet material from a supply roll across an elongated flat table or platform which supports the same and permits articles to be placed therein in longitudinally spaced relation and to subsequently form said strip of material into an elongated tube surrounding said articles and to apply heat and pressure to the overlapped marginal edge portions of said strip to form a sealed tube and to subsequently sever and seal said tube transversely thereof between the spaced articles to form individual wrappers within which said articles are sealed.

Still more specifically, it is an object to provide a machine having mechanism for initially forming a strip of flexible material into a pair of upwardly folded longitudinal side portions and a horizontally disposed central portion at the bottom of said longitudinal side portions to permit insertion of articles onto said bottom portion, said mechanism feeding said strip progressively toward overlapping and longitudinal sealing mechanism for forming a continuous sealed tube around the articles and thereafter transversely sealing and severing said tube to provide individual wrappers for each article.

It is still another specific object to provide a machine designed for use with transparent sheet material responsive for sealing to application of heat and pressure to package articles therein and having a light-responsive mechanism for controlling the timing of the actuation of the sealing and feeding mechanisms and working in cooperation with the transparent sheet material for individually wrapping articles.

These and other objects and advantages of this invention will more fully appear from the following description made in connection with the accompanying drawings wherein like reference characters refer to the same or similar parts throughout the several views and in which:

Fig. 1 is a top plan view of a machine embodying this invention showing a strip of material passing therethrough;

Fig. 2 is a side elevational view of the machine shown in Fig. 1 with the packaging strip broken away;

Fig. 3 is an enlarged vertical sectional view taken substantially along the line 3—3 of Fig. 1;

Fig. 4 is a vertical sectional view taken substantially along the line 4—4 of Fig. 3;

Fig. 5 is a vertical sectional view taken substantially along the line 5—5 of Fig. 3; and Fig. 6 is a fragmentary vertical sectional view of the backing shoe and mounting bracket therefor.

As illustrated in the accompanying drawings, there is provided a table 10 having a flat horizontal top surface. A strip-dispensing mechanism is mounted at one end of the table and comprises a supply roll 11 mounted for rotation on a shaft 12 journalled in a suitable supporting frame structure 13. The strip of material passes upwardly from the roll 11 around an idler roller 14 and downwardly therefrom around a spring mounted tensioning idler 15 and upwardly therefrom around a second fixed idler 16 and downwardly from idler 16 to a folding roller 17 positioned precisely along the longitudinal center line of the strip and the tension in the strip causing the sides to fold upwardly and form a bottom portion which travels along the top surface of the table 10 and is adapted to receive articles in spaced relation thereon between the upstanding side marginal portions. The tensioning roller 15 is mounted on a bell crank arm structure 18 which has a tensioning spring and rod assembly 19 for maintaining a predetermined tension therein and for applying a brake 20 to the roller shaft 12. This strip tensioning mechanism is of more or less conventional design and does not form a part of the invention herein disclosed.

A pair of feeder rollers, best shown in Figs. 3 and 4 and respectively designated by the numerals 21 and 22, are journalled in a suitable frame structure 23 disposed at the other end of table 10 remote from the strip-dispensing and tensioning mechanism. The two rollers are mounted for rotation on a pair of parallel horizontally disposed axis with the axis of roller 21 being disposed directly above the axis of roller 22. The top roller 21 has a highly resilient padded outer cylindrical surface which is yieldable to permit an article contained in the wrapper to pass between said rollers and the outer surface of the lower cylindrical roller 22 has a frictional surface such as sheet rubber mounted thereon.

Suitable mechanism is provided for overlapping the upstanding side marginal portions of the strip before the same is passed through the rollers 21 and 22 and after the articles have been placed therein. A backing shoe 24 is rigidly mounted on the supporting frame 23 as by being carried by a cross bar 25. As best shown in Figs. 1, 3 and 6, only the rear portion of the backing shoe or plate 24 is connected with the frame 23 and the rest of the shoe 24 is disposed in freely suspended upwardly spaced relation from a supporting platform 26 which forms an extension of table top 10 and is mounted on the supporting frame structure 23. Fig. 3 best shows the spaced relation between the backing shoe 24 and the top surface of platform 26 which is provided to permit the lower layer of the wrapping strip with an article placed thereon to pass under said shoe with the two overlapped marginal side portions passing over the shoe and forming the top wrapping layer. A substantially horizontally disposed mounting bracket 24a is securely fixed to the rear portion of backing plate 24 adjacent one longitudinal side portion thereof and is connected at its other end to an upstanding member 25a fixed to the cross bar 25. The bracket 24a comprises a substantially flat plate which has a depressed attachment portion at one end thereof to permit the major portion of the backing shoe 24 to be spaced downwardly below the major portion of said bracket 24a.

The upstanding support 25a is laterally offset from the longitudinal center line of shoe 24 on the opposite side from the attachment of bracket 24a with said shoe to permit one fold to pass under said bracket and the other fold to pass over the same in order to form a closed tube with the marginal edge portions of the strip overlapped. A pair of fold-forming rollers 27 are mounted for free rotation on a pair of downwardly convergent axes slightly inclined from the vertical and have their inner peripheral portions frictionally engaged against the respective layers of the wrapping strip to press said layers downwardly against the top surface of shoe 24.

The top longitudinal marginal edge portions of the shoe 24, are, in the form shown, beveled downwardly to permit a relatively sharp fold to be formed along each side of the wrapping strip and the rollers 27 engage the flat top portion of said shoe 24 in inwardly spaced relation from the beveled portions and securely press the respective folded marginal portions against said shoe. The rollers 27 have a smooth slightly frictional engagement surface, such as hard rubber or the like, and are mounted on swingable arms 27a which are journalled on the respective shafts 28 to permit the weight of the rollers 27 to urge the same downwardly toward said shoe 24. A pair of resilient pressing arms 29 are mounted on suitable supports for resiliently urging the same downwardly against the top surfaces of the two overlapped folds of wrapping material, one of the blades underlying the overlapped portion of said material but overlying the marginal portion of said material which underlies the other marginal edge portion thereof and the other blade overlies the marginal portions of both folds and securely presses the same together and tightly holds the same in engagement with the top surface of the shoe 24. A second pair of rollers 30, similar to rollers 27 and disposed slightly forwardly of the presser blades 29, maintain tight engagement of the two overlapped layers with the top surface of shoe 24.

A heated positively driven sealing roller 31 is mounted for engagement with the longitudinal lapped seam overlying said shoe 24 between the two rollers 30 and the heating element thereof having sufficient weight along with the other structure thereof to press the two lapped portions together against the top of backing shoe 24 to positively seal the longitudinal seam and form a closed tube surrounding the articles previously placed on said strip. The roller 31 is mounted on a swingable supporting arm 32 fixed to a sleeve 33 which is journalled for oscillation on a rotatable shaft 34 and has a rocker arm 35 fixed at one end thereof to engage a releasable stop mechanism 36 which normally holds said rocker arm 35 and said wheel in upwardly spaced relation above the shoe but permits releasing thereof to shift the arm 32 downwardly and engage the roller 31 with the overlapped longitudinal seam riding along the center of shoe 24. A suitable driving connection, such as the chain and sprocket drive 37, forms a positive drive between drive shaft 34 and the wheel 31 to rotate said sealing wheel at the same rate as the wrapping material is drawn through the rollers 21 and 22. After the tube of wrapping material has been formed around the spaced articles, the entire tube with the articles therein passes through the feeding rollers 21 and 22 and outwardly onto a conveyor belt structure 38 consisting, in the form shown, in a number of spaced belt elements. The conveyor belt structure 38 carries the articles and the tube away from the rollers 21 and 22 and delivers the same to a transversely disposed reciprocating cutting and sealing head 39, best shown in Figs. 1 and 3. A second conveyor belt structure 40 extends outwardly beyond the sealing and cutter head 39 and delivers the sealed individually wrapped packages to a suitable collection location.

The sealing and cutter head 39 is, in the form shown, reciprocably mounted on supporting structure 23 and is carried by a reciprocated carriage having a pair of upstanding rods 41 mounted for vertical sliding movement in suitable bearings 42 which form guides therefor. As best shown in Fig. 5, two pairs of guiding bearings 42 are provided for the respective rods 41 and an actuating cross member, such as the angle iron 43, is securely fixed to said rods 41 to reciprocate the same. A knife-carrying head 39a is mounted in fixed relation at the top of the rods 41 and rigidly carries a knife blade 39b thereon. A pair of spaced heating elements 39c form a knife-receiving passage therebetween and are carried by the knife-carrying head 39a and a number of yieldable resilient spacers 39d are interposed between the lower edge of head 39a and the upper edges of the heating and transverse sealing elements 39c. Each of the sealing elements has anvil means or a stationary block 44 mounted thereunder, as best shown in Fig. 3, and when the knife mounting head 39a is reciprocated downwardly with the rods 41 the heating and sealing elements 39c engage said fixed blocks 44 and further downward reciprocation of the head 39a compresses the resilient elements 39d and causes the knife 39b to sever the tube of packaging material between the articles and said heating and sealing elements 39c seal the rear end of the front package and the front end of the rear package simultaneously with the severing action of the knife 39b. A spring 45 normally urges the reciprocating carriage downwardly, as best shown in Figs. 3 and 5, and a pair of cam-actuated rocker arms 46 normally hold said carriage in upwardly disposed position, being connected with cross bar 43 by the adjustable links 47 and being fixed to a rock shaft 48 for oscillation thereby.

A suitable source of driving power is provided such as the electric motor 51 which drives a cam shaft 52 through a gear box 53, stub shaft 53a, chain and sprocket drive 54 and a friction clutch mechanism 55. A cam 56 is fixed to shaft 52 to be driven thereby and a cam follower and actuating arm assembly 57 actuated by cam 56 imparts oscillating movement to a rock shaft 48 to which a pair of cam-actuated rocker arms 46 are fixed for transmitting the oscillating movement of shaft 48 to the carriage to reciprocate the same through the links 47. A stop cam 58 is fixed to shaft 52 and has an abutment shoulder formed in the periphery thereof for engagement against a stop dog 59 which is pivotally mounted as at 60, best shown in Fig. 3. A solenoid 61 is connected to an intermediate portion of the pivoted stop dog 59, as by rod 62 and energization of the solenoid 61 retracts rod 62 and releases dog 59 from the engaged shoulder on cam 58 to permit one revolution of shaft 52, the shaft 52 being normally positively held against rotation by said dog and cam to produce slippage of friction clutch 55 and is released only upon energizing of solenoid 61. A drive shaft 63 is journalled in supporting structure 23 and is constantly driven by a driving connection such as the chain and sprocket drive 64 interconnecting the same with shaft 53a. A positively actuated clutch 65 is mounted in shaft 63 and controls the transmission of power to the lower feeding roller 22 through another chain and sprocket driving connection 66. A clutch controlling cam track 67 is fixed to cam shaft 52 and a pivoted clutch control lever 68 with a clutch actuating fork 68a fixed thereto controls the engagement and disengagement of clutch 65, the fork 68a being pivotally connected with the shiftable element of the clutch 65 as best shown in Fig. 4. The lower end of lever 68 has a roller journalled thereon and is received in the cam track 67, as best shown in Fig. 4 and is intermittently oscillated by said cam track. A pinion 69 is fixed to the shaft on which the lower feeding roller 22 is mounted and is intermeshed with a reversing pinion 70 which drives a chain and sprocket driving mechanism 71. Said chain and sprocket drive 71 is connected with the upper feeding roller 21 to drive the same and also produces rotation of the heated longitudinal sealing roller 31 through a sprocket connection with the rotatable shaft 34 and the chain and sprocket drive 37. Obviously, the chain and sprocket drive 66 which drives the lower feeding roller 22 and chain and sprocket drive 71 which drives the upper feeding roller 21 and sealing roller 31 will to constantly driven as long as the clutch 65 is engaged and will be intermittently stopped by the cam track 67 periodically disengaging said clutch 65 during each rotation of the cam shaft 52. It should be noted that the dog 58 engages the abutment shoulder of the stop cam 58 when the solenoid 61 is de-energized to normally hold the cam shaft 52 against rotation. The stopped position of cam shaft 52 is such that the cam track 67 holds the clutch 65 in engaged position to produce constant rotation of drive shaft 63 until the solenoid 61 is again energized to release the dog 58 from engagement with the abutment shoulder of stop cam 59.

Any suitable control for the solenoid 61 may be provided which is responsive for actuation to the position of the articles within the tubular container relative to transverse sealing and severing head 39. We provide a photo electric cell mechanism 73 which is mounted between the feeding rollers and the transverse sealing and severing head 39. This photo electric cell mechanism 73 controls a relay (not shown) in a conventional manner which in turn is connected in series with the winding of solenoid 61 to energize the same whenever the light beam of the photo electric cell mechanism 73 is not obstructed. We use a transparent packaging strip through which the light beam of mechanism 73 is permitted to pass, unless obstructed by an article being wrapped therein. The beam of the cell mechanism 73 is positioned to pass between the spaced belt elements of the belt system 38 and it is obvious that whenever the light is unobstructed by an article being wrapped the solenoid 61 will be energized to lift dog 59 and permit one revolution of shaft 52. This revolution of shaft 52 disengages clutch 65 to stop the feeding rollers 21 and 22 and sealing roller 31 and reciprocates the sealing and severing head 39 during the interval when said feeding rollers are stopped. It obviously also precisely positions the articles being wrapped and the spaces therebetween relative to the sealing and severing mechanism so that a slight misplacing of the articles in the wrapper strip will have little if any effect on the sealing of the packages and it is impossible for the head 39 to be reciprocated whenever an article is passing therethrough.

A chain and sprocket driving connection 72 is constantly driven from drive shaft 63 and is connected with a driving pulley structure 40a of the discharge conveyor belt 40 to constantly drive the same. The lowermost idler 40b of conveyor belt system 40 as well as the lowermost idler 38a of the belt system 38 is mounted for vertical shifting movement in a pair of transversely spaced vertically slotted brackets. The brackets for belt system 40 are designated by the number 49 and for belt system 48 by the numeral 50. The weight of the idlers 40b and 38a of the respective belt systems maintains the desired tension therein.

Operation

The wrapper strip is drawn off from the supply roll 11 and is properly tensioned by the tensioning idler 15. The folding roller 17 is journalled on an axis disposed transversely of the strip and having its center disposed on the longitudinal center line of said strip. The roller 17 is slightly less than one-half as long as the width of the strip and is substantially equal in length to the width of the backing shoe 24. Said forming roller produces a pair of preliminary longitudinal breaks or folds in said wrapping strip to position the longitudinal marginal edge portions of said strip in substantially upstanding relation and permit a worker to insert articles between said upstanding marginal portions in the desired longitudinally spaced-apart relation. Suitable markings may of course be provided on the strip to indicate the proper position of each article. In the form shown, the table 10 is provided for supporting the article carrying wrapper strip as it is drawn across the platform or table 10 by the rollers, but obviously if the articles are relatively heavy suitable anti-friction conveyor means such as an endless conveyor belt or the like (not shown) would have to be provided for shiftably supporting the wrapper strip as it travels toward the folding mechanism. As the wrapper strip moves onto the backing shoe 24, the left-hand layer as viewed in Fig. 6 will underlie the supporting bracket 24a and the right-hand layer will overlie said bracket. The folding rollers 27 and 30 and the pressing arms or blades 29 securely hold the two flaps in overlapped relation and press the same tightly against the top surface of shoe 24. The rear end of said shoe is upturned so that the articles carried on the wrapping strip will pass thereunder and the shoe will provide a rigid backing against which the driven heating roller 31 firmly presses the overlapped marginal edge portions of the wrapper to form a continuous tube and a longitudinal seal around the articles contained therein. The peripheral speed at which the sealing roller 31 is driven is precisely the same as the peripheral speed of the feeding rollers 21 and 22 so that there is no slippage between the surface of the heated roller 31 and the seam of the wrapper strip.

After the longitudinal seal has been formed by the heated sealing roller 31, the articles contained within the closed sealed tube now formed by the wrapper strip successively pass between the rollers 21 and 22. The highly resilient yieldable padding surrounding at least one of the feeding rollers, such as the roller 21, permits the articles to pass between the rollers while still providing a tight gripping action on the tubular strip at the spaces between said articles. This resilient pressure produced on the tubular strip positively evacuates the air from said strip as the same passes between said rollers and forms an air lock which prevents air from re-entering the tubular strip before the same has been sealed. The cutter head 39 is of course intermittently reciprocated and simultaneously transversely seals the rear edge of one package while sealing the front edge of the next package and severing the first package from the next package. Obviously, there is no time when the front end of the strip will be open after the same has passed between the feeding rollers 21 and 22 and therefore the evacuation of the wrapper strip will produce evacuation in each of the individual packages formed by the transverse sealing and severing head 39.

Photo electrical cell mechanism 73 controls the rotation of drive shaft 52 and synchronizes said rotation with the position of the articles drawn between said feeding rollers 21 and 22 relative to the transverse sealing and cutting head 39. The shaft 52 is of course driven through the friction slip clutch mechanism 55 and the top dog 59 normally engages the abutment of said cam to hold shaft 52 against rotation until release of the dog from said abutment. The solenoid 61 retracts the dog 59 to lift the same from abutting position against the abutment of cam 59. Only when there is no obstruction for the beam of the electric eye 73, will said electric eye energize the solenoid 61 to retract the dog 59 from the abutment stop of cam 58 and permit one revolution of the cam shaft 52. Therefore, as long as an opaque article such as an article being wrapped is interposed between the light source and the light responsive element of said photo electric cell mechanism 73, the solenoid 61 will be de-energized and the dog 59 will hold cam shaft 52 against rotation and the clutch 65 will remain in engaged position until the opaque article being wrapped passes beyond the beam of the eye and the space between said articles is interposed in the beam of said eye to permit the beam to travel therethrough and energize solenoid 61, the dog 59 will be retracted to permit another full revolution of cam 59 and shaft 52 and thus disengage clutch 65 to a stop the feeding rollers 21 and 22 and longitudinal sealing roller 31 for a predetermined interval during which time the sealing and severing head 39 is reciprocated.

The downward reciprocation of the sealing and cutting head 39 produced by the actuating cam 56 permitting the springs 45 to pull said head 39 downwardly simultaneously forms a pair of slightly spaced transversely sealed portions disposed in parallel relationship and the knife 39b transversely severs the wrapper strip between said sealed portions. The outer conveyor belt system 40 carries the individual packages outwardly away from the sealing head 39 and delivers them to a suitable storage location.

It will be seen that we have provided a highly efficient wrapping machine adapted to progressively draw a strip of transparent wrapping material from a supply roll thereof, producing a pair of spaced longitudinal folds in intermediate portions of said material, holding said folds in substantially upright position to facilitate an operator placing articles therein in longitudinally spaced apart relation and thereafter overlapping said folded portions to completely enclose said articles within the wrapping strip and sealing said wrapping strip longitudinally to form an enclosing tube around said articles. The articles are then carried between a pair of feeding rollers, at least one of which has a highly compressible surface such as the sponge rubber surface on roller 21 to not only draw the articles and wrapper strip therethrough but to also evacuate the air therefrom.

The photo electric cell mechanism 73 controls the stopping of the feeding rollers and the driven longitudinal sealing roller to permit transverse sealing and severing of the packages. The positive actuation of the starting point of each revolution of cam shaft 52 controlled by the actual position of the articles in said wrapping strip relative to the sealing and severing head 39 positively synchronizes the position of the articles and spaces therebetween with the actuation of the sealing head 39 to prevent mis-timing of the reciprocation of the sealing head 39 and possible damage to the articles being wrapped. The articles are thus individually wrapped in sealed substantially evacuated containers which are transparent to display the same for sale.

It will, of course, be understood that various changes may be made in the form, details, arrangement, and proportions of the parts without departing from the scope of this invention which, generally stated, consists in the matter shown and described herein and set forth in the appended claims.

What we claim is:

1. An article wrapping machine having in combination feeding mechanism for engaging an elongated strip of wrapping material with articles enclosed therein to progressively move said strip and articles through the machine, longitudinal sealing mechanism including means for folding the strip around the articles to be wrapped and for sealing the marginal edge portions of said strip to form a continuous tube around said articles, transverse sealing mechanism for individually sealing the tube at spaced apart points, a transverse severing mechanism actuated substantially simultaneous with the transverse sealing mechanism for separating the sealed wrappers, a rotary drive shaft connected with said feeding mechanism and said longitudinal sealing mechanism for positively driving the same, a rotary cam shaft driven independently of said rotary drive shaft and having releasable means for normally holding said cam shaft against rotation, control mechanism responsive for actuation to the position of articles within the wrapper strip relative to said transverse sealing and severing mechanisms and connected with the releasable stop means for said rotary cam shaft to release the same only when an article is not interposed between the transverse sealing and severing mechanisms, actuating apparatus interconnecting said transverse sealing and severing mechanisms with the cam shaft to actuate said mechanisms only when said cam shaft is permitted to rotate, and means in said drive shaft and controlled by said cam shaft for stopping said drive shaft when said cam shaft is permitted to rotate.

2. An article wrapping machine having in combination feeding mechanism for engagement with an elongated strip of transparent material with opaque articles placed therein in spaced apart relation for progressively moving said strip, a longitudinal sealing mechanism for producing an article enclosing tube around said articles, a transverse sealing and severing mechanism for sealing and severing said tube between the spaced articles therein, a source of rotary driving power, a pair of shaft assemblies connected with said power source to be driven thereby, one of said shaft assemblies constituting a control shaft and the other shaft assembly constituting a drive shaft and having a releasable driving clutch mounted therein, a driving connection between the clutch controlled portion of said driving shaft assembly and both the feeding mechanism and the longitudinal sealing mechanism to normally drive the same except when the driving clutch is disengaged, a light responsive control unit including a control light beam directed toward said transparent wrapping strip with the spaced opaque articles therein, a control shaft stop mechanism operatively associated with said light responsive control unit and constructed to hold said control shaft against rotation whenever said light beam is interrupted but responsive to actuation by said light beam when the same passes through the transparent wrapper material to release said stop mechanism and permit rotation of said control shaft, an actuating connection between said control shaft and said clutch mechanism for disengaging said clutch mechanism when said control shaft is rotated, a driving connection between said control shaft and the transverse sealing and severing mechanisms for actuating the same whenever said control shaft is rotated, and a slip clutch mechanism interposed between the driving connection of the control shaft and the source of driving power to permit said shaft to be normally held against rotation during the travel of said article containing wrapper strip through the feeding mechanism and longitudinal sealing mechanism.

3. The structure set forth in claim 2, and said light beam control mechanism constituting a photoelectric cell with a light source disposed in spaced relation therefrom and positioned with the wrapper strip and opaque articles interposed therebetween, and the releasing mechanism for the stop element of said cam shaft constituting a solenoid connected with the photoelectric cell and responsive for actuation to energization of said cell by said light source.

References Cited in the file of this patent

UNITED STATES PATENTS

| | | |
|---|---|---|
| 2,127,183 | Moore | Aug. 16, 1938 |
| 2,155,398 | Bronander | Apr. 25, 1939 |
| 2,320,326 | Avery | May 25, 1943 |
| 2,340,260 | Clunan | Jan. 25, 1944 |
| 2,522,682 | Lewis | Sept. 19, 1950 |
| 2,580,456 | Noe | Jan. 1, 1952 |
| 2,600,216 | Denison | June 10, 1952 |
| 2,613,488 | Attride | Oct. 14, 1952 |
| 2,655,777 | Hagen | Oct. 20, 1953 |
| 2,737,764 | Lewis | Mar. 13, 1956 |
| 2,747,346 | Tigerman et al. | May 29, 1956 |

FOREIGN PATENTS

| | | |
|---|---|---|
| 327,229 | Great Britain | Apr. 3, 1930 |
| 80,931 | Sweden | July 10, 1934 |